(12) United States Patent
Matsuno

(10) Patent No.: US 9,367,284 B2
(45) Date of Patent: Jun. 14, 2016

(54) RECORDING DEVICE, RECORDING METHOD, AND RECORDING MEDIUM

(71) Applicant: YAMAHA CORPORATION, Hamamatsu-shi, Shizuoka-Ken (JP)

(72) Inventor: Koichi Matsuno, Fukuroi (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 0 days.

(21) Appl. No.: 14/607,701

(22) Filed: Jan. 28, 2015

(65) Prior Publication Data

US 2015/0212787 A1 Jul. 30, 2015

(30) Foreign Application Priority Data

Jan. 30, 2014 (JP) ................................ 2014-015096

(51) Int. Cl.
*G11B 19/20* (2006.01)
*G06F 3/16* (2006.01)
*G05B 15/02* (2006.01)
*G11B 27/031* (2006.01)

(52) U.S. Cl.
CPC ............. *G06F 3/165* (2013.01); *G05B 15/02* (2013.01); *G11B 27/031* (2013.01)

(58) Field of Classification Search
None
See application file for complete search history.

(56) References Cited

U.S. PATENT DOCUMENTS

| | | | | |
|---|---|---|---|---|
| 4,924,745 A * | 5/1990 | Kimpara et al. | ................. | 84/609 |
| 5,220,119 A * | 6/1993 | Shimada | ......................... | 84/609 |
| 5,397,853 A * | 3/1995 | Koguchi | .................. | 434/307 A |
| 5,442,424 A * | 8/1995 | Ito | ................................... | 399/66 |
| 5,818,801 A * | 10/1998 | Watanabe et al. | .......... | 369/30.23 |
| 5,923,441 A * | 7/1999 | Komada et al. | ............. | 358/437 |
| 6,584,053 B1 * | 6/2003 | Tsukihashi | ................ | 369/53.34 |
| 6,775,211 B1 * | 8/2004 | Tsukihashi | ................ | 369/47.28 |
| 6,819,641 B1 * | 11/2004 | Terao et al. | ................ | 369/47.16 |
| 2001/0036138 A1 * | 11/2001 | Kawashima et al. | ...... | 369/53.22 |
| 2001/0055249 A1 * | 12/2001 | Moriwaki | ..................... | 369/47.3 |
| 2002/0012297 A1 * | 1/2002 | Suzuki | ......................... | 369/47.3 |
| 2002/0044507 A1 * | 4/2002 | Hagiwara et al. | ............ | 369/47.4 |
| 2002/0134751 A1 | 9/2002 | Kawashima et al. | | |
| 2003/0165096 A1 * | 9/2003 | Mashiko | .................... | 369/47.28 |
| 2004/0105361 A1 * | 6/2004 | Arakawa | ..................... | 369/44.32 |
| 2004/0120689 A1 * | 6/2004 | Yamasaki | ....................... | 386/46 |
| 2006/0153033 A1 * | 7/2006 | Saito et al. | .................. | 369/47.33 |
| 2009/0002866 A1 * | 1/2009 | Shaver et al. | .................... | 360/51 |

FOREIGN PATENT DOCUMENTS

| | | | | |
|---|---|---|---|---|
| EP | 1887576 A1 * | 2/2008 | ............ | G11B 20/12 |
| JP | 09320148 A | 12/1997 | | |
| JP | 2000214884 A | 8/2000 | | |

\* cited by examiner

*Primary Examiner* — Peter Vincent Agustin
(74) *Attorney, Agent, or Firm* — Rossi, Kimms & McDowell LLP

(57) ABSTRACT

A recording device includes recording unit configured to perform recording; and stop control unit configured to stop the recording in accordance with a recording stop instruction and restarting the recording in accordance with a recording restart instruction. The stop control unit restarts the recording after reproducing a trailing part of a recorded content that is recorded before the stop.

14 Claims, 7 Drawing Sheets

FIG.3

| METER | | TEMPO | DURATION OF 1 BEAT(s) | DURATION OF 1 MEASURE(s) |
|---|---|---|---|---|
| 3 | 8 | 120 | 0.25 | 0.75 |
| 2 | 8 | 80 | 0.38 | 0.75 |
| 4 | 4 | 120 | 0.50 | 2.00 |
| 5 | 4 | 100 | 0.60 | 3.00 |
| 3 | 16 | 69 | 0.22 | 0.65 |
| 8 | 24 | 50 | 0.20 | 1.60 |

|  | DATA TYPE | TIMING | NOTE NUMBER |
|---|---|---|---|
| n1 | Note On | t1 | C3 |
|  | Note Off | T1 | C3 |
| n2 | Note On | t2 | E3 |
|  | Note Off | T2 | E3 |
| n3 | Note On | t3 | G3 |
|  | Note Off | T3 | G3 |
| n4 | Note On | t4 | F3 |
| n5 | Note Off | T4 | F3 |
|  | ⋮ | ⋮ |  |

RECORDING DEVICE, RECORDING METHOD, AND RECORDING MEDIUM

CROSS-REFERENCE TO RELATED APPLICATION

The present application claims priority from Japanese Application JP2014-015096, the content to which is hereby incorporated by reference into this application.

BACKGROUND OF THE INVENTION

1. Field of the Invention

The present invention relates to a recording device, a recording method, and a recording medium.

2. Description of the Related Art

Hitherto, there is known a recording device for recording a sound picked up by a microphone, a sound from a musical instrument being played, or the like. For example, Japanese Patent Application Laid-open No. 2000-214884 discloses a configuration in which a recording state and a pause state are alternatively set each time a record button is pressed. Further, Japanese Patent Application Laid-open No. Hei 09-320148 discloses a configuration in which an index mark is recorded in accordance with an index button in a recording state or a recording pause state.

SUMMARY OF THE INVENTION

In the related art, when recording is repeatedly stopped and restarted, it is difficult to appropriately join recorded contents before and after the stop to each other. That is, in the case where the playing of a musical instrument is recorded by using the technology disclosed in Japanese Patent Application Laid-open No. 2000-214884, a user cannot grasp a progress speed (such as a playing tempo) or the like of the sound before a recording stop when restarting the recording, which makes it difficult to maintain the progress speed before and after the stop at a fixed level. Further, it is difficult for the user to grasp a timing to restart the recording, and hence an unnatural silent state may occur after a recording restart, and the timing to restart the recording may become too early.

In addition, even when an index mark is recorded and the recording can be restarted from the index mark as disclosed in Japanese Patent Application Laid-open No. Hei 09-320148, the configuration in which the marker is recorded in accordance with the index button makes it difficult to synchronize a timing to restart the recording and a timing to operate the index button. Accordingly, when the recording is restarted at a timing at which the marker is recorded, there may be a case where the sounds before the recording stop and after the recording restart may not be joined to each other appropriately.

One or more embodiments of the present invention has been made in view of the above-mentioned problems, and an object thereof is to provide a technology capable of appropriately joining recorded contents before and after stopping to each other with ease when the recording is repeatedly stopped and restarted.

In one or more embodiments of the present invention, a recording device includes recording unit configured to perform recording; and stop control unit configured to stop the recording in accordance with a recording stop instruction and restarting the recording in accordance with a recording restart instruction. The stop control unit restarts the recording after reproducing a trailing part of a recorded content that is recorded before the stop.

In one or more embodiments of the present invention, a recording method includes a recording step of performing recording, and a stop control step of stopping the recording in accordance with a recording stop instruction and restarting the recording in accordance with a recording restart instruction. The stop control step includes restarting the recording after reproducing a trailing part of a recorded content that is recorded before the stop.

In one or more embodiments of the present invention, a non-transitory computer-readable recording medium having stored thereon a recording program includes instructions; to perform recording; and control to stop the recording in accordance with a recording stop instruction and restart the recording in accordance with a recording restart instruction. The control instruction includes an instruction to restart the recording after reproducing a trailing part of a recorded content that is recorded before the stop.

BRIEF DESCRIPTION OF THE DRAWINGS

FIG. 3 is a table for showing an example of data included in a recorded content.

DETAILED DESCRIPTION OF THE INVENTION

Figure 1A:
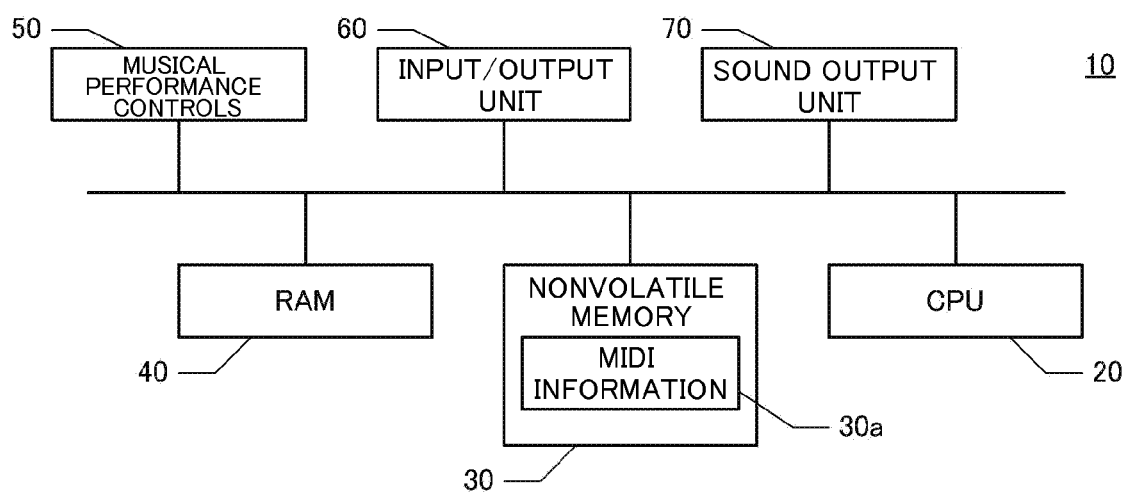
FIG. 1A is a diagram illustrating a block diagram of a recording device according to one embodiment of the present invention.

First, a description is made of an outline of an embodiment of the present invention.

A recording device according to the embodiment of the present invention includes recording unit for performing recording and stop control unit for stopping the recording in accordance with a recording stop instruction and restarting the recording in accordance with a recording restart instruction. The stop control unit restarts the recording after reproducing a trailing part (trailing end) of a recorded content that is recorded before the stop.

That is, the recording device is configured so that, in order to restart the recording after the recording is stopped, the recording is restarted after a recorded content, which is recorded between a time point before a recording stop and a time point of the recording stop, has been reproduced. Therefore, a user who generates a sound to be recorded can generate the sound to be recorded in accordance with a progress speed of a sound before the recording stop, which makes it easy to maintain the progress speed of the sounds before and after the recording at a fixed level. Further, the reproduction before the recording restart allows the user to easily grasp a timing to restart the recording, and hence it becomes easy to prevent an unnatural silent state from occurring after the recording restart, and to prevent the timing to restart the recording from becoming too early. Accordingly, when the recording is repeatedly stopped and restarted, it is possible to appropriately join the recorded contents before and after the stop to each other with ease.

Here, it suffices that the recording unit can perform recording and can record a sound in a recording medium in a reproducible state. Information to be recorded may be any one of analog information and digital information, and information other than the sound, for example, a marker or an image may be recorded along with the sound.

It suffices that the stop control unit can stop the recording in accordance with the recording stop instruction and can restart the recording in accordance with the recording restart instruction. That is, it suffices that the recording device is configured to enable a user to issue the recording stop instruction and the recording restart instruction through an arbitrary interface, and the stop control unit can stop and restart the recording in accordance with those instructions. It suffices that the interface is configured to enable the user to issue an instruction based on the user's intention, and may be formed of a sensor or the like for detecting a movement of the user's body directly or indirectly and assuming the movement as an instruction. Note that, examples of the sensor for detecting the movement of the user's body directly include a sensor for detecting an action of a button, a pedal, a hand, an eye, or the like, and examples of the sensor for detecting the movement of the user's body indirectly include a sensor or the like for detecting a sound output when the user performs an operation for playing a musical instrument or an action of an operator (a control).

In addition, it suffices that, in the above-mentioned configuration, the stop control unit can restart the recording after the trailing part of the recorded content that is recorded before the stop has been reproduced. That is, it suffices that the stop control unit is configured to notify the user of the progress speed of the sound before the recording stop and the state of the sound before the recording stop by reproducing and outputting the sound of the trailing part of the recorded content. It suffices that the user may be notified of a length of the trailing part of the recorded content is set so that the progress speed of the sound before the recording stop and the state of the sound before the recording stop, and the length may be a fixed length or may be a variable length.

For example, the trailing part of the recorded content may be reproduced by a fixed length determined in advance. Further, when a time period corresponding to a silent part exists in the trailing part, a time period corresponding to a sounding part may be detected from the recorded content, and the length of the time period corresponding to the trailing part may be determined and reproduced so as to include the time corresponding to the sounding part. In addition, the length of the time period corresponding to the trailing part may be determined so that the time period corresponding to the sounding part becomes equal to or longer than a predetermined time period. In addition, when the recorded sound is music, the length of the time period corresponding to the trailing part (or sounding part) may be increased or reduced in accordance with a playing tempo, and the number of measures included in the trailing part may be increased or reduced so that the length of the time period corresponding to the trailing part (or sounding part) is maintained at a fixed level in accordance with the playing tempo. In addition, a time period between a break of the music (such as break between measures, break between phrases, position of breath, or position of rest) within the time period corresponding to the sounding part and the time point of the recording stop may be set as the time period corresponding to the trailing part. The break can be identified by different kinds of indices, and the break may be identified so that, for example, the trailing part of the recorded content becomes closest to the fixed length. In addition, the user may be allowed to designate a reproduction start timing and the length of the time period corresponding to the trailing part. Alternatively, the length of the trailing part may be shortened by assuming that musical performing skills and the like of the user have improved as the number of times that the recording is restarted increases.

In addition, when the recording is stopped and restarted, while recording the recording data indicating the recorded content in the recording medium, the recording unit may record recording data including information indicating a timing at which the recording is restarted in the recording medium. That is, when the recording data includes the information indicating the timing at which the recording is restarted, the timing at which the recording is restarted can be identified by detecting the information indicating the timing at which the recording is restarted from the recording data. Accordingly, it is possible to restart the reproduction or the recording at the above-mentioned timing, and in a case where the recording is to be restarted, it is also possible to restart the recording after the trailing part of the recorded content that is recorded before the stop has been reproduced.

Further, the recording unit records the information in the recording data, and hence the user does not need to instruct himself/herself to record the marker indicating the timing to stop or restart the recording. Accordingly, without depending on the timing or the like of the user's operation, it is possible to integrate information, which allows identification of the timing at which the recording is restarted, into the recording data automatically. Further, with reference to the information indicating the timing at which the recording is restarted, it is possible to accurately identify the timing at which the recording is restarted, the length of the trailing part to be reproduced before the recording is restarted, or the like. Accordingly, in a case where the recording is to be performed again from the same position based on the information indicating the timing at which the recording is restarted, it is possible to appropriately join the sounds before the recording stop and after the recording restart.

Note that, as the information indicating the timing at which the recording is restarted, any information that can at least identify the timing at which the recording is restarted may be employed, and information indicating the timing itself at which the recording is restarted or information having a predetermined relationship with the timing at which the recording is restarted may be employed. Examples of the latter include information indicating the timing of a measure break or a rest that comes immediately before the timing at which the recording is restarted.

In addition, there may be employed a configuration in which the recording unit records the sound generated by playing the musical instrument, and the stop control unit assumes sound generation made by the musical instrument as the recording restart instruction. According to this configuration, the user can issue the recording restart instruction only by emitting the sound by playing the musical instrument. Accordingly, when the playing of the musical instrument is recorded with the recording device, it is possible to prevent an occurrence of an unnatural silent state ascribable to the operation or the like of the button or the like for the recording restart instruction between the recording start and the sound generation.

Next, embodiments of the present invention are described in the following order.
(1) Configuration of the Recording Device:
(1-1) Recording Processing:
(1-2) Recording Restart Processing:
(2) Other Embodiments:

(1) Configuration of the Recording Device

FIG. 1A is a block diagram illustrating main components of an electronic musical instrument 10 provided with a recording device according to one embodiment of the present invention. The electronic musical instrument 10 illustrated in FIG. 1A is an electronic musical instrument that can be played by operating a musical performance controls 50, and includes a CPU 20, a nonvolatile memory 30, a RAM 40, the musical performance controls 50, an input/output unit 60, and a sound output unit 70. The musical performance controls 50 is an operator such as a key, and the user designates a sound to be output by operating the musical performance controls 50. The input/output unit 60 includes an input unit for inputting a designation or the like from the user and an output unit for outputting various kinds of information (image information and audio information) to the user. Here, a display (output unit) provided with a touch panel (input unit) is assumed as the input/output unit 60.

The sound output unit 70 includes a speaker and a circuit for outputting the sound corresponding to the operation of the musical performance controls 50. The CPU 20 can execute programs recorded in the nonvolatile memory 30 by using the RAM 40 as a temporary storage area. By executing one of the programs, the CPU 20 identifies an operation content of the musical performance controls 50, and identifies a sound generator of the sound being played and a generation mode thereof based on sound information (not shown) created in advance. Then, the CPU 20 outputs, to the sound output unit 70, such an instruction that the sound corresponding to the operation of the musical performance controls 50 is to be output with the sound generator and the generation mode that are identified by the sound information. As a result, the sound output unit 70 generates and amplifies a musical sound signal for outputting the designated sound, and outputs a musical sound from the speaker.

Further, MIDI information 30a can be recorded in the nonvolatile memory 30, and the CPU 20 can play the musical sound based on the MIDI information 30a. That is, the CPU 20 acquires the MIDI information 30a indicating the musical sound to be played from the MIDI information 30a recorded in the nonvolatile memory 30, records the MIDI information 30a in the RAM 40, refers to MIDI information recorded in the RAM 40 to identify a pitch and timings or the like to start and finish outputting the sound in time series, and outputs the identified sounds to the sound output unit 70 in order, to thereby be able to play the musical sound based on the MIDI information.

Note that, it suffices that the MIDI information 30a has a normal format of MIDI information, and the MIDI information 30a is structured by information indicating an occurrence timing of an event and information indicating an output start timing of the sound, an output end timing thereof, a pitch thereof, and the like. In addition, the MIDI information 30a can record changes of the sound in time series for each of a plurality of sound generators, and the sound generators include various musical instruments and a metronome. Information on entire musical sounds such as a tempo thereof may be recorded in the MIDI information 30a.

In this embodiment, the CPU 20 can reproduce the musical sound by using the MIDI information 30a recorded in the nonvolatile memory 30 in advance, and can also generate and use the MIDI information 30a indicating the musical sound obtained when the electronic musical instrument 10 is played. That is, in this embodiment, it is possible to generate and reproduce the MIDI information 30a indicating the sound output as a result of playing the electronic musical instrument 10. Accordingly, in this embodiment, it is possible to record the content of the playing of the electronic musical instrument 10, and to generate the MIDI information 30a as the recording data.

Figure 2A:
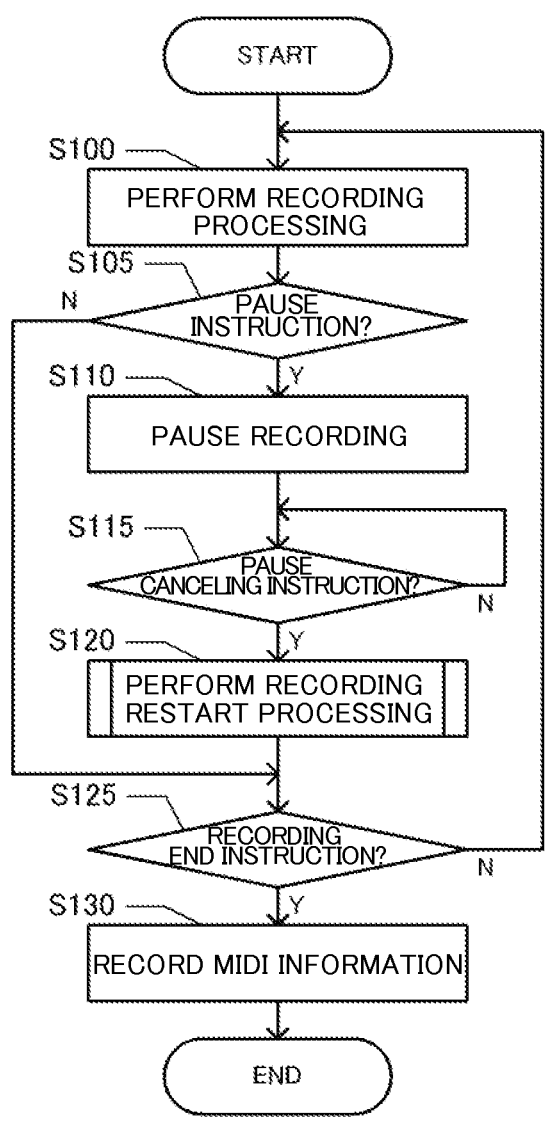
FIG. 2A is a flowchart illustrating recording processing.

(1-1) Recording Processing:

Next, a detailed description is made of the recording processing. The CPU 20 can execute recording by executing a recording program (not shown) recorded in the nonvolatile memory 30. The recording program includes a recording unit and a stop control unit as program modules, and the CPU 20 executes the recording by the processing of the recording unit. FIG. 2A is a flowchart illustrating processing executed by the CPU 20 in accordance with the recording program. When execution of the recording program is started, the CPU 20 executes the recording processing (Step S100).

In the recording processing, when the recording start is instructed by the recording start button displayed on the input/output unit 60, the CPU 20 starts counting the timing by counting an output signal from a time measuring circuit (not shown). Further, while counting the timing, the CPU 20 receives an operation performed for an operator (a control) based on the output signal from the musical performance controls 50. When the control of the musical performance controls 50 is operated, the CPU 20 outputs the sound corresponding to the control from the sound output unit 70, and records an operation timing of the control in the RAM 40.

In addition, the CPU 20 executes the pause of the recording and the restart of the recording by the processing of the stop control unit. That is, during the recording processing, the CPU 20 determines based on the output signal from the input/output unit 60 whether or not the user has issued a pause instruction by a pause button when the input/output unit 60 displays the pause button and a recording end button (Step S105). When it is not determined in Step S105 that the pause instruction has been issued, the CPU 20 determines based on the output signal from the input/output unit 60 whether or not the user has issued the recording end instruction by the recording end button (Step S125). When it is not determined in Step S125 that the recording end instruction has been issued, the CPU 20 repeats the processing of Step S100 and the subsequent steps. That is, the CPU 20 continues the recording state.

On the other hand, when it is determined in Step S105 that the pause instruction has been issued, the CPU 20 pauses the recording (Step S110). That is, the CPU 20 suspends processing for receiving the operation of the musical performance controls 50 and counting the timing, to thereby pause the recording. Note that, at this time, the MIDI information may be saved to the nonvolatile memory 30 in order to allow the MIDI information generated until the pause is performed to be used.

Next, the CPU 20 stands by until it is determined based on the output signal from the input/output unit 60 that cancellation of the pause has been instructed by the user again operating the pause button (Step S115). When it is determined in Step S115 that the cancellation of the pause has been instructed, the CPU 20 performs the recording restart processing (Step S120). The recording restart processing is processing for enabling appropriate joining of the recorded contents before and after the stop to each other with ease when the recording is repeatedly stopped and restarted, and details thereof are described later.

When the recording restart processing is finished, the recording is restarted, and the CPU 20 executes Step S125. When it is determined in Step S125 that the recording end instruction has been issued, the CPU 20 records, in the nonvolatile memory 30, the MIDI information 30a indicating the recorded sound (Step S130). That is, the CPU 20 finishes the processing for recording the operation timing of the control of the musical performance controls 50, and then generates, as one file, the MIDI information 30a indicating the sound to be output by the operation of the control recorded between the recording start and the recording end, and records the MIDI information 30a in the nonvolatile memory 30.

(1-2) Recording Restart Processing:

Next, a detailed description is made of the recording restart processing of Step S120. In this embodiment, the CPU 20 restarts the recording after reproducing the trailing part of the recorded content by the processing of the stop control unit. For this, when the recording restart processing is started, the CPU 20 first determines a reproduction start position (Step S200). In this embodiment, the reproduction start position is determined so that a playing period corresponding to a fixed time period is included in the trailing part of the recorded content that is recorded before the pause. Specifically, the CPU 20 refers to the RAM 40 to identify, as the playing period, a period during which the sound is being emitted by the playing based on the MIDI information recorded before the pause, identifies the reproduction start position so that the length of the trailing part of the playing period becomes the fixed time period, and sets a period between the reproduction start position and the position of the pause as a reproduction target.

Figure 1B:
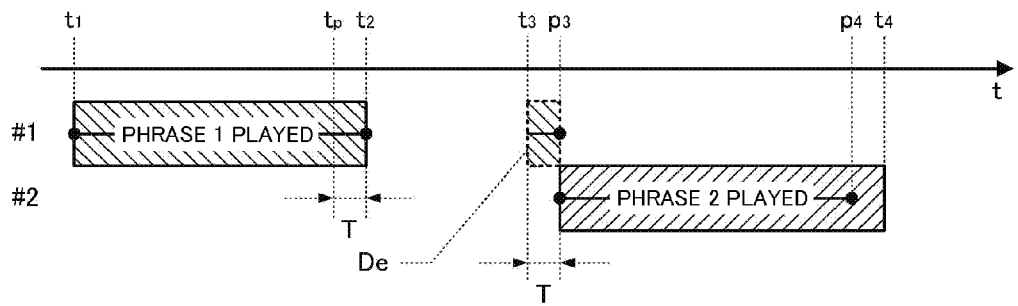
FIG. 1B is a graph schematically showing an output timing of the sound obtained when recording is restarted after a pause thereof.
Figure 1C:
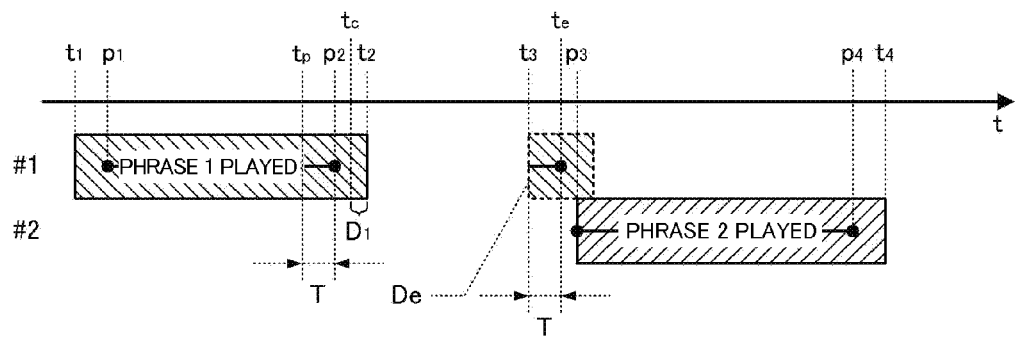
FIG. 1C is a graph schematically showing an output timing of the sound obtained when recording is restarted after a pause thereof.

FIG. 1B and FIG. 1C are graphs schematically showing an output timing of the sound obtained when the recording is restarted after the recording is paused with the horizontal axis shown as a time axis t, and indicate a time slot during which the recording is performed as a solid rectangle and a time slot during which the reproduction is performed (or reproduction is to be performed) as an alternate long and short rectangle. FIG. 1B assumes a case where the user starts the recording at a time $t_1$, performs the first recording by playing Phrase 1 during a period between the time $t_1$ and a time $t_2$ (#1), and pauses the recording at the time $t_2$. In addition, FIG. 1B assumes a case where the pause is canceled at a time $t_3$. In this case, at the time $t_3$, the CPU 20 executes the recording restart processing of Step S120 via Step S115, and determines the reproduction start position in Step S200. In the example shown in FIG. 1B, Phrase 1 is played between the time $t_1$ and the time $t_2$, and hence the recording period and the playing period before the pause are the same. Therefore, the CPU 20 refers to the MIDI information on the first recording that is recorded in the RAM 40 to determine a time ($t_2$–T) as a reproduction start position $t_p$. Note that, here, T represents a symbol indicating the length of a fixed time period.

FIG. 1C assumes a case where the user starts the recording at the time $t_1$, performs the first recording by playing Phrase 1 during a period between a time $p_1$ and a time $p_2$ (#1), and pauses the recording at the time $t_2$. In addition, FIG. 1C assumes a case where the pause is canceled at the time $t_3$. In this case, at the time $t_3$, the CPU 20 determines the reproduction start position. In the example shown in FIG. 1C, Phrase 1 is played between the time $p_1$ and the time $p_2$, and hence the recording period and the playing period before the pause are different. Therefore, the CPU 20 refers to the MIDI information on the first recording that is recorded in the RAM 40 to determine a time ($p_2$–T) as the reproduction start position $t_p$.

In this case, the period between the time $p_2$ and the time $t_2$ becomes a silent state. In this embodiment, the trailing part of the recorded content before the recording stop is reproduced in order to allow the recording of the playing to be restarted without changing the progress speed of the sound. Accordingly, as in the example shown in FIG. 1C, when only a part in the silent state is reproduced in a case where a part immediately before the recording stop is in the silent state, such reproduction is not informative in terms of grasping the progress speed of the sound before the recording stop. Accordingly, in this embodiment, the CPU 20 determines the reproduction start position so that the playing period of Phrase 1 corresponding to the fixed time period is included in the trailing part of the recorded content, to thereby prevent a reproduced part before the recording restart from becoming only the part in the silent state.

Note that, in this embodiment, the playing period is a period during which the operation is performed for the musical performance controls 50, and the period other than the playing period (silent period) is a period during which the musical performance controls 50 is kept from being operated. Accordingly, the time at which the musical performance controls 50 is operated last before the recording stop may be set as the last time of the playing period, or when the musical performance controls 50 is kept from being performed over a period whose length is equal to or longer than a threshold value immediately before the recording stop, a period excluding the above-mentioned period may set as the playing period. Note that, the period whose length is equal to or longer than the threshold value may be defined by units of time (such as seconds), or may be defined by the number of rests or the like. A case where the control of the musical performance controls 50 is operated for a slight time period (time shorter than a reference value) may be assumed as noise instead of the playing operation and may not be included in the playing period.

When the reproduction start position is determined, the CPU 20 starts the reproduction from the reproduction start position (Step S205). That is, the CPU 20 refers to the RAM 40 to acquire the MIDI information after the reproduction start position, and outputs the sound to be reproduced to the sound output unit 70 based on the MIDI information. The examples of FIG. 1B and FIG. 1C schematically show that a trailing part $D_e$ including the playing period having the length T is extracted from the first recorded content and the reproduction is started after the time $t_3$.

Next, the CPU 20 determines whether or not a sound generation instruction has been issued (Step S210). In this embodiment, the CPU 20 employs a configuration in which the sound generation instruction is assumed as the recording restart instruction. When a signal indicating that the sound generation instruction has been issued by the control is output from the musical performance controls 50, the CPU 20 assumes that the recording restart has been instructed by the instruction. When it is determined in Step S210 that the sound generation instruction has been issued, the CPU 20 stops the reproduction started in Step S205, and acquires a timing of the sound generation instruction (Step S215). Then, the CPU 20 erases the MIDI information after the timing of the sound generation instruction from the RAM 40 (Step S220).

In addition, the CPU 20 restarts the recording, and acquires the timing of the recording restart (Step S225). Note that, in this embodiment, the sound generation start instruction is assumed as the recording restart instruction, and hence the timing of the sound generation instruction is the same as the timing of the recording restart. When the recording is restarted, the CPU 20 performs the same processing as that of Step S100. Subsequently, the CPU 20 records a marker at the recording restart timing (Step S230). That is, the CPU 20 associates the marker with the MIDI information associated with the recording restart timing among the MIDI information generated after the recording restart and recorded in the RAM 40. Specifically, the CPU 20 records, within the MIDI information 30*a*, information in which a marker event is associated with the timing of the marker event. In addition, the marker can be structured by information that can be retrieved after the MIDI information 30*a* is recorded, and can be structured by a specific ID, a flag, or the like.

FIG. 1B and FIG. 1C assume examples in which the sound generation instruction is issued at the time $p_3$. In FIG. 1B, the time $p_3$ is the same time as the end time of the trailing part $D_e$ of the fixed time period T. That is, FIG. 1B shows an example in which the last timing of Phrase 1 and the first timing of Phrase 2 are the same, and exemplifies a case where Phrase 2 starts to be played after the reproduction of Phrase 1 is finished. Accordingly, in this example, the trailing part $D_e$ of the first recording content does not exist after the timing (time $p_3$) of the sound generation instruction. Therefore, the recording is restarted in Step S225 after the time $p_3$ without erasing the MIDI information indicating the first recorded content.

On the other hand, FIG. 1C shows an example in which the time $p_3$ precedes the end time of the trailing part $D_e$ and succeeds a last timing $t_e$ of Phrase 1. In this example, the trailing part $D_e$ of the first recorded content exists after the timing (time $p_3$) of the sound generation instruction. Therefore, the CPU 20 refers to the RAM 40 to erase the MIDI information corresponding to the part after the timing (time $p_3$) of the sound generation instruction from the MIDI information indicating the first recorded content, and restarts the recording in Step S225 after the time $p_3$. Note that, in FIG. 1C, the part to be erased is indicated as $D_1$, and as a result of the erasure, information obtained between the time $t_1$ and the time $t_c$ is held as the first recorded content.

As described above, in this embodiment, the trailing part including the performed content before the recording stop is reproduced, and hence the user can play after the recording restart in accordance with the progress speed of the sound before the recording restart, which can maintain the progress speed of the sounds before and after the recording at a fixed level. Further, the reproduction before the recording restart allows the user to easily grasp the timing to restart the recording, and it is easy to prevent an unnatural silent state from occurring after the recording restart and to prevent the timing to restart the recording from becoming too early. Accordingly, when the recording is repeatedly stopped and restarted, it is possible to appropriately join the recorded contents before and after the stop with ease. In addition, the recording is restarted when the user starts the operation of the musical performance controls 50, and hence the recording start and the sound generation are performed simultaneously. Accordingly, it is possible to prevent the occurrence of an unnatural silent state ascribable to an operation or the like of the button or the like for the recording restart instruction between the recording start and the sound generation.

In addition, by recording the marker as described above, the recording restart timing can be identified after the MIDI information 30*a* indicating the recorded content is created. Accordingly, the reproduction and the recording can be restarted at the above-mentioned timing, and the recording can be restarted as well after the trailing part of the recorded content that is recorded before the stop has been reproduced in the case where the recording is to be performed again. Further, the user himself/herself does not need to instruct to record the marker, and without depending on the user's operation timing or the like, it is possible to integrate information that can identify the timing at which the recording is restarted into the MIDI information automatically.

When the recording restart processing is executed as described above, the CPU 20 returns to the processing illustrated in FIG. 2A to execute Step S125 and the subsequent steps. The examples shown in FIG. 1B and FIG. 1C assume a case where, after the sound generation instruction is issued at the time $p_3$, the user performs the second recording by playing Phrase 2 up to a time $p_4$ (#2), and finishes the recording at a time $t_4$. Accordingly, in this example, when the CPU 20 executes Step S125 and the subsequent steps after the recording restart processing, the CPU 20 repeats a loop of Steps S100, S105, and S125, and saves the MIDI information as a file in Step S130 in accordance with the recording end instruction at the time $t_4$.

Then, in the case of the example shown in FIG. 1B, the part erased from the first recorded content does not exist, and hence in Step S130, the CPU 20 generates one file by coupling the recorded content between the time $t_1$ and the time $t_2$ and the recorded content between the time $p_3$ and the time $t_4$. In the case of the example shown in FIG. 1C, the part $D_1$ is erased from the first recorded content, and hence in Step S130, the CPU 20 generates one file by coupling the recorded content between the time $t_1$ and the time $t_c$ and the recorded content between the time $p_3$ and the time $t_4$.

On the other hand, when it is not determined in Step S210 that the sound generation instruction has been issued, the CPU 20 determines whether or not the reproduction has been performed up to the pause position (Step S240). That is, the CPU 20 determines whether or not the reproduction has been performed up to an end terminal of the recorded content before the pause (recorded content at the time $t_2$ in the example shown in FIG. 1B and FIG. 1C) recorded in the RAM 40. When it is not determined in Step S240 that the reproduction has been performed up to the pause position, the CPU 20 repeats the processing of Step S210 and the subsequent steps. On the other hand, when it is determined in Step S240 that the reproduction has been performed up to the pause position, the CPU 20 executes the processing of Step S225 and the subsequent steps.

Figure 1D:
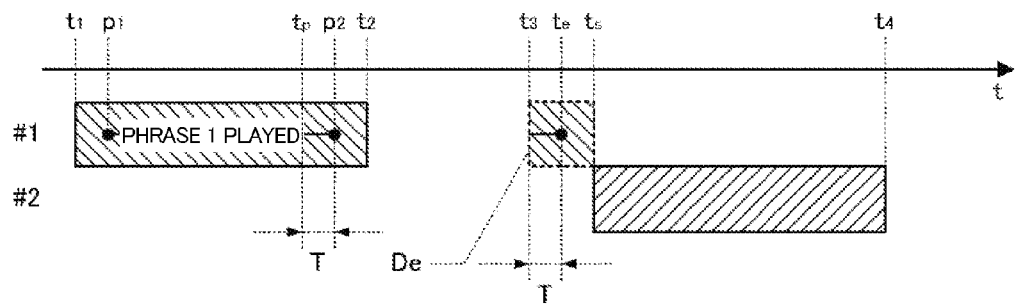
FIG. 1D is a graph schematically showing an output timing of the sound obtained when recording is restarted after a pause thereof.

FIG. 1D is a graph showing a case where the sound generation instruction has not been issued up to the pause position in the example shown in FIG. 1C. In this example, the sound generation instruction is not issued even after the trailing part De of the recorded content before the pause has been reproduced up to the end terminal thereof, and hence the recording is restarted at a time $t_s$ of the end terminal of the trailing part $D_e$. Note that, the example shown in FIG. 1D assumes that the operation is not performed for the control of the musical performance controls 50 after the time $t_s$, and in this case, the sound becomes the silent state without being recorded while the recording is executed after the time $t_s$. When the recording end instruction is issued at the time $t_4$, in Step S130, the CPU 20 generates one file by coupling the recorded content between the time $t_1$ and the time $t_2$ and the recorded content (silence) between the time $t_3$ and the time $t_4$. Note that, even in the above-mentioned case, the marker indicating the time $t_8$ serving as the recording restart timing is recorded within the MIDI information 30a, and hence the user can easily grasp the progress speed of the sound by restarting the recording again from the marker and reproducing the trailing part $D_e$ of the recorded content before the recording stop in this case.

(2) Other Embodiments

The above-mentioned embodiment is merely an example for carrying out the present invention, and in addition, it is possible to employ various embodiments. For example, the configuration of the electronic musical instrument 10 is not limited to the above-mentioned configuration, and may be a configuration in which the MIDI information 30a or the like recorded in a detachably attachable recording medium is acquired and edited, or may be a configuration in which the MIDI information 30a or the like is acquired from another device via a communication interface and edited. In addition, the nonvolatile memory 30 may be any recording medium that can hold various kinds of information, and can be formed of a flash memory or the like, but another memory may be used, or the recording medium may be formed of another medium such as a hard disk drive.

In addition, in the above-mentioned embodiment, the trailing part $D_e$ to be reproduced before the recording restart is determined based on the sound played by the user, but may be determined in consideration of another sound (sound in another track or another channel or the like). For example, when the recording is performed on the electronic musical instrument 10 while the sound of accompaniment, a metronome, or the like is reproduced, a case where the sound of the accompaniment or the like exists is not assumed as the silence even without the existence of a playing sound, and the trailing part may be determined so that a time period during which the sound of the accompaniment or the like or the sound being played is sounded is included by a fixed time period. The trailing part may be determined so that the time period during which the sound being played is sounded is included by the fixed time period without taking the sound of the accompaniment or the like into consideration when the accompaniment or the like is reproduced.

In addition, in the above-mentioned embodiment, the recording is restarted by pausing the recording and canceling the pause, but the trailing part of the recorded content before the stop may be reproduced when the recording after the stop position is restarted after the recording is stopped and after another work or another playing is performed, and then the recording may be restarted.

In addition, in the recording process of one song, a plurality of pause positions may be provided. For example, in the example shown in FIG. 1B, when a song in which Phrase 3 follows Phrase 2 is recorded, the recording may be paused after Phrase 2 is played, and when the pause is canceled, the trailing part of the recorded content of Phrase 2 may be reproduced.

In addition, a trigger for restarting the recording may differ from the above-mentioned embodiment. For example, in the recording restart processing, when the sound generation instruction is not issued even after the reproduction is performed from the reproduction start position up to the pause position, the CPU 20 may be inhibited from restarting the recording, and may wait until the sound generation instruction or the recording end instruction is issued. In addition, the recording restart may be instructed by a control other than the musical performance controls 50. For example, the CPU 20 may assume that the recording restart instruction has been issued when the button, the pedal, or the like provided to the electronic musical instrument 10 is operated. In this case, the recording restart timing is not always the same as the operation timing (sound generation timing) of the musical performance controls 50, and hence the timing before the sound generation timing can be set as the recording start timing, which allows the marker to be recorded at the timing before the sound generation timing.

In addition, the recording device according to one embodiment of the present invention may be constituted by a device other than the electronic musical instrument. For example, the recording device according to one embodiment of the present invention may be constituted by recording equipment for recording the results of sound pickup performed by the microphone or the like. In this case, the determination of the playing period and the determination of the period of the sounding may be carried out based on a sound pressure level of the sound picked up by the microphone or the like, and may be carried out based on a result of analyzing a frequency of the picked-up sound, and various configurations can be employed.

Next, as an example of the configuration of the (1) recording device and the reproduction of the trailing part of the recorded content according to the (2) other embodiments, reproduction performed in units of measures is described. As described above, the CPU 20 starts the recording after reproducing the trailing part of the recorded content recorded before the stop. In regard to the reproduction of the trailing part, the reproduction is started in units of measures of music when, for example, the music is recorded content. This allows the reproduction to start from a position in which the break is more appropriate in the flow of the music.

In this case, the number of measures to be reproduced may be changed depending on the length of a unit measure. Specifically, for example, first, as shown in FIG. 3, the length of one measure of the music is calculated based on time signature information indicating a time signature of the music included in the recorded content and tempo information indicating a tempo thereof. Here, in FIG. 3, the respective rows indicate a three-eight time, a two-eight time, a four-to-four time, and the like in order from the first row. When the calculated length of one measure is equal to or shorter than a threshold value (first threshold value), the reproduction is started from four measures before the measure in which the recording is stopped. On the other hand, when the calculated length of one measure is longer than the first threshold value, the reproduction is started from two measures before. Note that, the tempo is represented by, for example, the number of quarter notes per minute. Further, when the musical performance (the playing) is recorded as data having a MIDI format, the time signature information and the tempo information are recorded automatically in accordance with settings on the electronic musical instrument to be played, but even when the musical performance (the playing) is recorded as data having a format that has no information on the time signature or the tempo (for example, waveform data), the time signature or the tempo can be estimated by analyzing the recorded data by using an existing tempo estimation technology.

For example, when the first threshold value is set to 1 second in FIG. 3, the length of one measure equal to or shorter than one second is indicated in the first row, the second row, and the fifth row, and hence the reproduction of the music corresponding to those rows is started from four measures before, while the reproduction of the music corresponding to the other rows is started from two measures before. Note that, the example shown in FIG. 3 is merely an example, and another threshold value or the like may be used. Most music tracks are composed with four measures as a reference unit, and hence, according to the above-mentioned configuration, the user can reproduce the music track from the position in which the break is more appropriate. Note that, a threshold value (second threshold value) corresponding to the tempo information may be provided instead of the length of the unit measure, and when the tempo information is equal to or smaller than a predetermined threshold value (second threshold value), that is, when the tempo is slow, the reproduction may be performed from two measures before, while, when the tempo information is larger than the predetermined threshold value, the reproduction may be performed from four measures before. With this method, the reproducing time period may be too short or too long depending on the time signature, while the time period per measure does not need to be calculated compared to the method using the first threshold value, which reduces a calculation amount.

Further, in the reproduction of the trailing part of the above-mentioned recorded content, when the trailing part is set as a predetermined period (for example, period of four measures or two measures described above), it may be detected whether or not the trailing part includes the sound generation of the recording target (for example, playing sound when the recording target is the sound of the piano being played), and when the sound generation is not included, the recorded content of the trailing part may be acquired so as to include the sound generation, to be reproduced.

Specifically, for example, when the reproduction is started from four measures or two measures before in accordance with the length of the unit measure as described above, it is detected whether or not the sound being played exists during a period of four measures or two measures. When the sound being played is not detected during the period of four measures or two measures, a temporal position in which the last playing sound is recorded is detected within the recorded content. Then, the position four measures or two measures before the measure including the playing sound is set as the reproduction start position. According to the above-mentioned configuration, for example, the reproduction that does not include the sound generation is prevented from being performed in the reproduction of the trailing part at the recording restart.

Note that, in this case, the number of notes of the playing sound that have been played within the four measures or two measures (for example, the number of notes of a melody part for which the keys have been pressed on an electronic piano) may be calculated, and when the number of notes is smaller than a predetermined threshold (for example, three notes), a position further a predetermined number of measures before (for example, two measures) may be set as the reproduction start position. Note that, instead of calculating only the number of notes of the melody part, the number of notes of another part such as an accompaniment part may be calculated as well. The above-mentioned configuration allows the user to start the playing at the recording restart after grasping the content to be played.

Figures 4A, 4B:
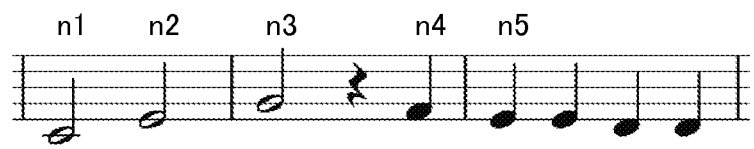
FIG. 4A is a diagram for illustrating another example of the data included in the recorded content.
FIG. 4B is a table for showing another example of the data included in the recorded content.

Further, for example, when the above-mentioned recorded content is the playing of the electronic piano, and when the playing of the piano (for example, when sheet music of FIG. 4A is played) is recorded as the MIDI data, as shown in FIG. 4B, the MIDI data includes sound generation start information (Note On) indicating depressing of the key of the electronic piano (that is, sound generation start), sound generation stop information (Note Off) indicating releasing of the key of the electronic piano (that is, sound generation stop), timing information indicating timings of the key pressing and key releasing, and a note number indicating a key. Note that, the timing information is recorded in the format of, for example, Bar, Beat, or Clock. Specifically, the head of the first beat of the tenth measure counted from the recording start time is represented by "10,01,001". Further, in the above-mentioned format, Clock indicates a resolution per beat, and the resolution is, for example, 480.

Accordingly, for example, when the musical performance (the playing) is recorded in the MIDI data format, and when it is determined whether or not the playing sound is included, it may be detected whether or not the playing sound is included in the reproduction period at the recording restart time (for example, period of four measures or two measures) in accordance with the timing information corresponding to "Note On" in the recorded MIDI data. Note that, the case of using the MIDI data is merely an example, and a data format having another format may be used. Specifically, for example, in the case of the data format indicating the above-mentioned recorded content by the waveform, the position in which the key is pressed, and an elapsed time period from the recording start time, or the like may be acquired by analyzing the waveform, and it may be detected whether or not, for example, the playing sound is included in the reproduction period (for example, period of four measures or two measures) at the recording restart time.

Figure 5A:
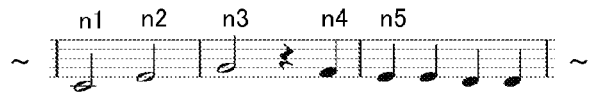
FIG. 5A is a diagram for illustrating a modification example of this embodiment.
Figure 5B:
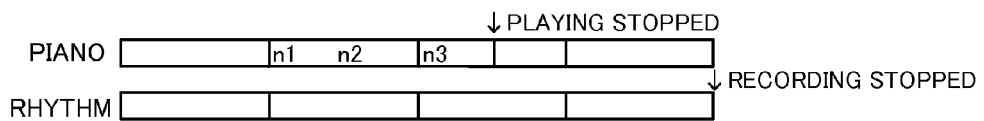
FIG. 5B is a diagram for illustrating the modification example of this embodiment.

Next, a description is made of a modification example in which, in the above-mentioned configuration, the recorded content is formed by adding the sound (for example, accompaniment) of a recording target (second recording target) stored in advance such as a rhythm part to the sound (for example, sound of the electronic piano being played) of the recording target (first recording target). Here, the recording target stored in advance corresponds to, for example, repeated reproduction of a drum pattern for one measure prepared in advance. Note that, for the sake of simplicity in description, the following description assumes the case where when the user uses the electronic piano to play the sheet music illustrated in FIG. 5A and records the playing along with the rhythm part, the user stops playing after playing n3 and then stops recording at the measure subsequent to the measure including n3 as illustrated in FIG. 5B. In addition, a description is made of a case where, at the recording restart time, the reproduction is started from two measures before the measure including the recording stop position, and the playing of the piano is started from n4.

In this case, in the first recording, the recording is stopped after the piano is played up to n3, and hence as illustrated in FIG. 5B, the playing up to the end of the sound of n3 is included in the recorded content serving as the piano part. In the rhythm part, the recording is stopped at the measure subsequent to the playing stop as illustrated in FIG. 5B, and hence the rhythm part having a period until the recording stop is instructed is included in the recorded content. Note that, the case where the playing stop position of the piano and the recording stop position of the rhythm part are different is described above, but the two may be the same.

Figure 5C:
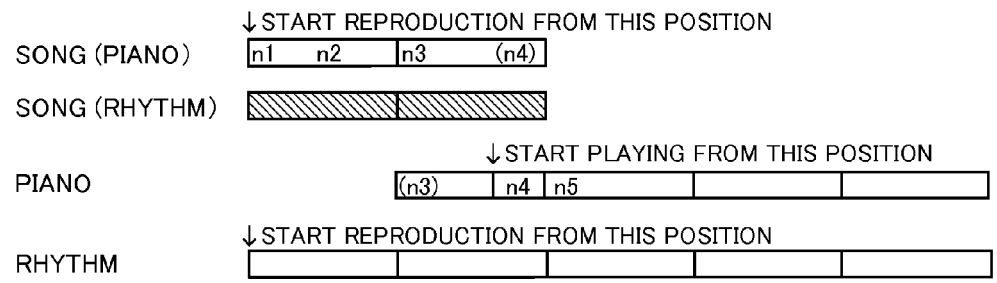
FIG. 5C is a diagram for illustrating the modification example of this embodiment.

In the second recording (recording restart time), as described above, the CPU 20 reproduces the trailing part of the recorded content that is recorded before the stop. Note that, in FIG. 5C, the recorded content of the rhythm part and the piano already recorded is described as "song" in order to be distinguished from the piano and the rhythm part played after the recording restart. Here, in this modification example, as illustrated in FIG. 5C, at the recording restart time, instead of reproducing (for example, by setting as a mute state) a recorded rhythm part included in the trailing part (hatched portion in FIG. 5C), the reproduction of the rhythm part stored in advance is started in accordance with the reproduction clock of the entire recording data including the first recording target (piano part) recorded in the first recording. Note that, this modification example is described by taking the case where the reproduction is started from two measures before the measure including the recording stop position at the recording restart time as an example, but this modification example is not limited thereto.

Figure 2B:
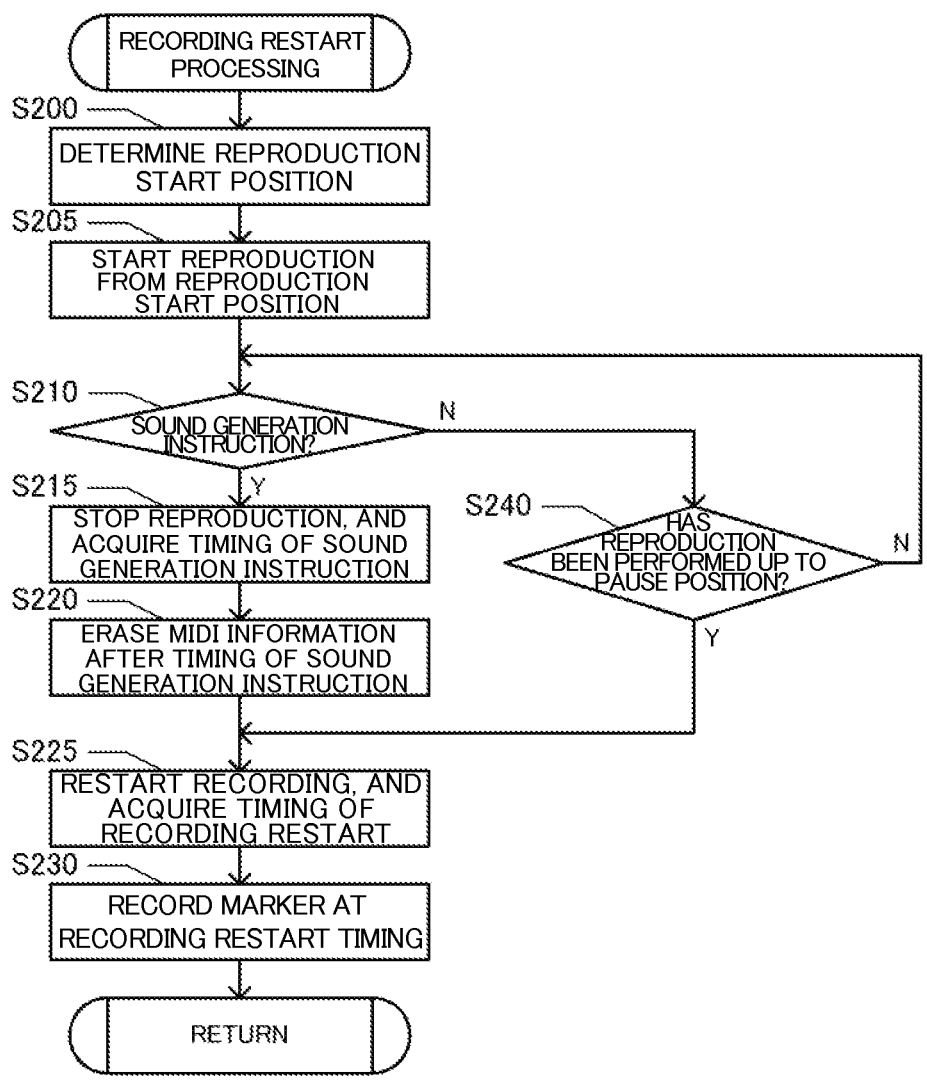
FIG. 2B is a flowchart illustrating recording restart processing.

Then, for example, as illustrated in FIG. 5C, in the piano part, the recording is started from a playing start position of n4. This is because, as illustrated in Step S210 of FIG. 2B, the recording is started by issuing the sound generation instruction (pressing the key of n4). In the same manner, also in the rhythm part, the recording is started from the playing start position of n4. Here, the rhythm part is reproduced in accordance with the reproduction clock of the entire recording part recorded in the first recording as described above, and hence the rhythm part in the first recording and the rhythm part in the second recording are synchronized with each other. Even when being connected in the middle of the measure, the first recording and the second recording are smoothly joined to each other without producing the silent part. Note that, in regard to the recording of the rhythm part, the recording may be started from the position different from the recording start position of the piano part. Specifically, for example, the recording may be restarted from the position that fits the break between measures such as the head position of the measure subsequent to the recording start position of the piano part. Note that, the above-mentioned configuration is premised on a case where the data indicating the rhythm part includes time information indicating the start time of each measure.

Figure 5D:
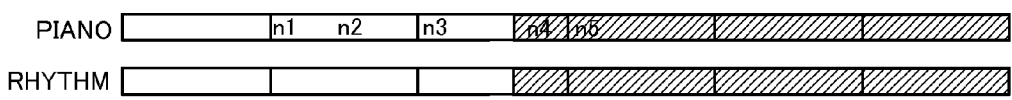
FIG. 5D is a diagram for illustrating the modification example of this embodiment.

With the above-mentioned configuration, as schematically illustrated in FIG. 5D, data indicating the recorded content formed of the piano part and the rhythm part is formed. Note that, in FIG. 5D, the hatched portions indicate an example of the part recorded in the second recording.

Figure 5E:
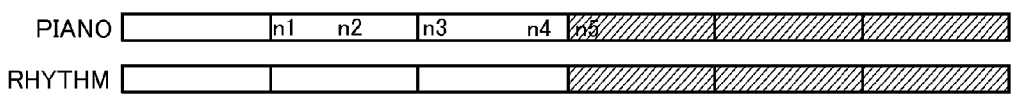
FIG. 5E is a diagram for illustrating the modification example of this embodiment.

Note that, for example, the case where the recording is restarted in accordance with the playing start such as the key pressing of the piano is described above, but the recording may be restarted from the top of the measure including the recording stop position. The data indicating the recorded content for this case is schematically illustrated in FIG. 5E. In FIG. 5E, the hatched portions indicate the part recorded in the second recording. In this case, for example, it is assumed that the recording of the piano part immediately before the measure at which the recording is stopped has been finished.

Figure 5F:
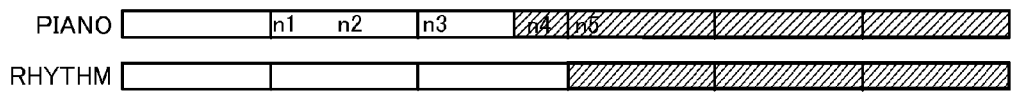
FIG. 5F is a diagram for illustrating the modification example of this embodiment.

In addition, as schematically illustrated in FIG. 5F, the recording may be restarted for the piano part from the playing start position, while the recording may be restarted for the rhythm part from the top of the measure including the recording stop position. In FIG. 5F, the hatched portions indicate the part recorded in the second recording. Note that, as an example, the case where the reproduction is started from two measures before the measure including the recording stop position at the recording restart time is described above, but the position to start the reproduction may be determined with the playing stop position subjected to the playing stop instruction as a reference, instead of the recording stop position. Note that, a recording stop instruction as recited in the claims includes the playing stop instruction.

In addition, the key pressing position of the piano or the recording stop position is set as the recording restart position in the above description, but in addition, the recording may be started from the position designated by the user by using the pedal or the like. In this case, when a user erases the trailing part of the content played for the first time to be replaced by a blank (rest), the recording may be started in the part into which the rest is to be inserted by using the pedal or the like. Note that, the example of using the drum pattern prepared in advance as the accompaniment is described above, but the accompanying sound may be a phrase having a scale or a chord, and may be arpeggio or the like generated in accordance with the chord played by the user. Further, a plurality of parts thereof may be combined.

Note that, the above description is made by mainly taking the electronic piano as an example, but the case of recording another sound of another musical instrument, voice, or the like is included. Further, various embodiments are described above, but the respective embodiments may be combined as long as there is no inconsistency therebetween.

What is claimed is:

1. A recording device, comprising:
   a recording unit configured to:
      perform recording; and
      record recording data indicating a recorded content in a recording medium; and
   a stop control unit configured to:
      stop the recording in accordance with a recording stop instruction;
      and restart the recording in accordance with a recording restart instruction after reproducing a trailing part of the recorded content that is recorded before the stop,
   wherein, in a case where the recording is restarted, the recording data includes information indicating a timing at which the recording is restarted.

2. The recording device according to claim 1, wherein:
   the recording unit is further configured to record a sound generated by playing a musical instrument; and
   the stop control unit is further configured to determine the sound generated by the musical instrument as the recording restart instruction.

3. The recording device according to claim 2, wherein a reproduction time period of the trailing part is determined in accordance with a tempo of the playing of the musical instrument.

4. The recording device according to claim 2, wherein the stop control unit is further configured to start the reproduction of the trailing part in accordance with a musical break of the playing of the musical instrument.

5. The recording device according to claim 1, wherein the reproduction of the trailing part comprises a time period including a part where a sound exists.

6. The recording device according to claim 1, wherein the stop control unit is further configured to delete, when the recording is restarted during the reproduction of the trailing part, a part after a recording restart time from among the recorded content.

7. The recording device according to claim 1, wherein the stop control unit is further configured to inhibit restarting the recording until the recording restart instruction is issued after the reproduction of the trailing part.

8. The recording device according to claim 1, wherein:
   the trailing part is reproduced in units of measures of the recorded content; and
   a number of measures included in the trailing part differs depending on the length of a unit measure of the recorded content.

9. The recording device according to claim 1, wherein:
   the trailing part is reproduced in units of measures of the recorded content;
   the recorded content comprises tempo information indicating a tempo of the recorded content; and a number of measures included in the trailing part differs depending on whether or not the tempo information is equal to or smaller than a threshold value.

10. The recording device according to claim 1, wherein:
the stop control unit is further configured to:
  determine whether or not a sound of a recording target of the recording unit is included in the trailing part; and
  in a case where it is determined that the sound of the recording target is not included in the trailing part, acquire and reproduce the trailing part so that a predetermined number of sounds of the recording target or more are included in the trailing part.

11. The recording device according to claim 1, wherein:
the recording unit is further configured to:
  record a sound of a first recording target and a sound of a second recording target that is set in advance; and
  at a recording restart time, restart the recording of the sound of the first recording target and the sound of the second recording target that is set in advance after the stop control unit reproduces the trailing part of the first recording target recorded before the stop and reproduces the second recording target that is set in advance and corresponds to the trailing part instead of the second recording target that is recorded before the stop.

12. The recording device according to claim 11, wherein the second recording target is reproduced in synchronization with the reproduction of the trailing part of the first recording target.

13. A recording method, comprising:
performing recording;
recording recording data indicating a recorded content in a recording medium;
stopping the recording in accordance with a recording stop instruction;
restarting the recording in accordance with a recording restart instruction after reproducing a trailing part of the recorded content that is recorded before the stop; and
updating the recording data, after the recording is restarted, to include information indicating a timing at which the recording is restarted.

14. A non-transitory computer-readable recording medium having stored thereon a recording program comprising instructions to:
perform recording;
record recording data indicating a recorded content in a recording medium;
control to stop the recording in accordance with a recording stop instruction;
control to restart the recording in accordance with a recording restart instruction after reproducing a trailing part of a recorded content that is recorded before the stop; and
update the recording data, after the recording is restarted, to include information indicating a timing at which the recording is restarted.

* * * * *